United States Patent
Zeritis

Patent Number: 5,395,408
Date of Patent: Mar. 7, 1995

[54] CHIMNEY SMOKE SCRUBBER

[76] Inventor: Nikolaos Zeritis, 4016 - 39th Ave., Oakland, Calif. 94619

[21] Appl. No.: 134,636

[22] Filed: Oct. 12, 1993

[51] Int. Cl.$^6$ .................................................. B01D 47/02
[52] U.S. Cl. ................................... 55/217; 55/256; 55/271; 55/473
[58] Field of Search ............... 95/14, 18, 226; 55/212, 55/217, 256, 210, 271, 467, 473

[56] References Cited

U.S. PATENT DOCUMENTS

| | | | |
|---|---|---|---|
| 468,408 | 2/1892 | June et al. | 55/256 |
| 581,448 | 4/1897 | White | 55/223 X |
| 875,223 | 12/1907 | Speier | 55/256 |
| 1,062,445 | 5/1913 | Ernst | 55/223 |
| 1,964,794 | 7/1934 | Gilbert | 55/256 X |
| 3,125,613 | 3/1964 | McCartney | 55/256 X |
| 3,462,919 | 8/1969 | Zalman | 55/256 |
| 3,716,967 | 2/1973 | Doyle, Jr. et al. | 55/217 |
| 3,835,625 | 9/1974 | Williams | 55/259 |
| 4,528,005 | 7/1985 | Baxter | 55/256 X |
| 4,668,253 | 5/1987 | Lonardi et al. | 55/217 X |
| 5,004,486 | 4/1991 | Chen | 55/256 X |
| 5,085,678 | 2/1992 | Woltman | 55/256 X |
| 5,141,537 | 9/1992 | Te | 55/223 |
| 5,143,527 | 9/1992 | Tian-Song | 55/256 X |

FOREIGN PATENT DOCUMENTS

| | | | |
|---|---|---|---|
| 55-109422 | 8/1980 | Japan | 55/217 |
| 59-029020 | 2/1984 | Japan | 55/256 |
| 02-126920 | 5/1990 | Japan | 95/14 |
| 02-229518 | 9/1990 | Japan | 55/256 |

*Primary Examiner*—Robert Spitzer
*Attorney, Agent, or Firm*—Harris Zimmerman

[57] ABSTRACT

A chimney smoke scrubber adapted for domestic use includes a chimney cap enclosure secured atop the chimney or flue pipe of a combustion unit. A blower is connected to the chimney cap enclosure to draw smoke and combustion gases from the enclosure and deliver them under pressure to a scrubber chamber. The scrubber chamber comprises a tank holding a charge of aqueous solution, and the duct outlet from the blower is submerged within the tank. The smoke and flue gases bubble through the water, cooling and cleaning them, extinguishing all cinders, and removing all fly ash. A thermal sensor within the chimney or flue pipe is connected to start the blower motor whenever there is a sufficient temperature rise to indicate that a fire has been started within the combustion unit. The unit switches on automatically only when needed, and remains in operation as long as the fire burns. The blower, motor assembly and scrubber chamber are enclosed within a weatherproof enclosure secured on the roof of the building adjacent to the chimney cap enclosure, the entire assembly forming a compact unit that is easily installed. The scrubber chamber is vented from the weatherproof enclosure to release the cleaned combustion gases to the atmosphere. The chimney cap enclosure includes a flapper valve to discharge combustion gases to atmosphere if the smoke scrubber fails to operate, or combustion gas flow exceeds the blower capacity.

10 Claims, 2 Drawing Sheets

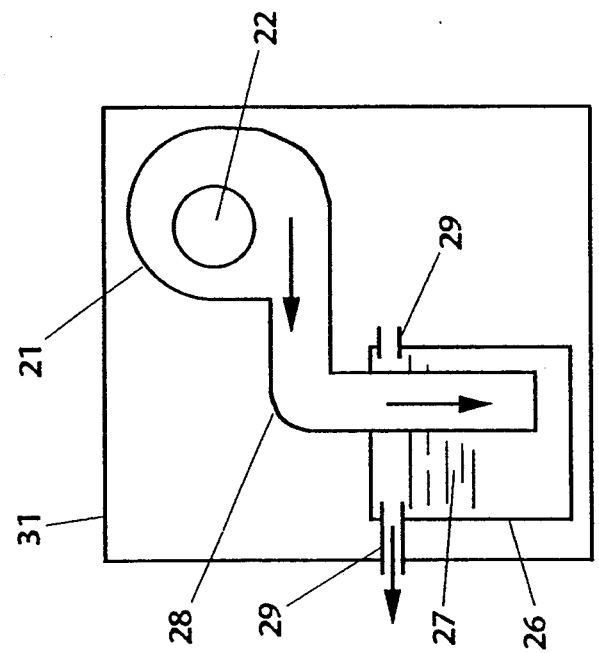
Figure_2
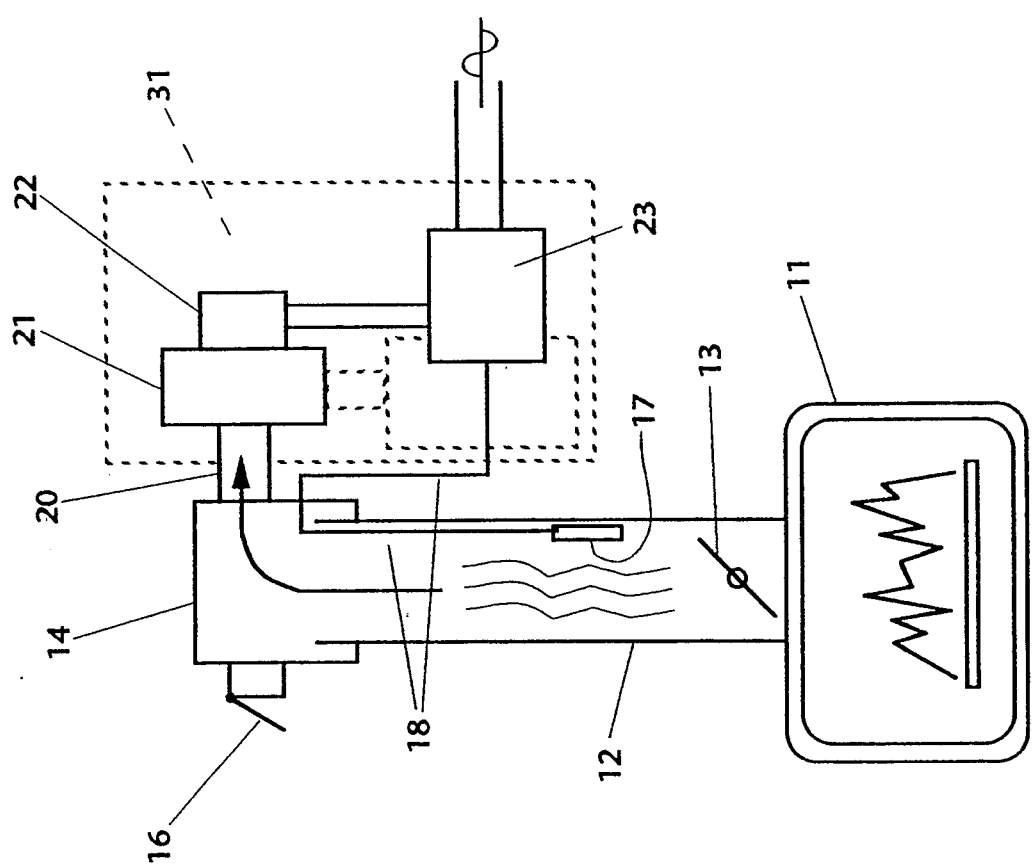
Figure_1

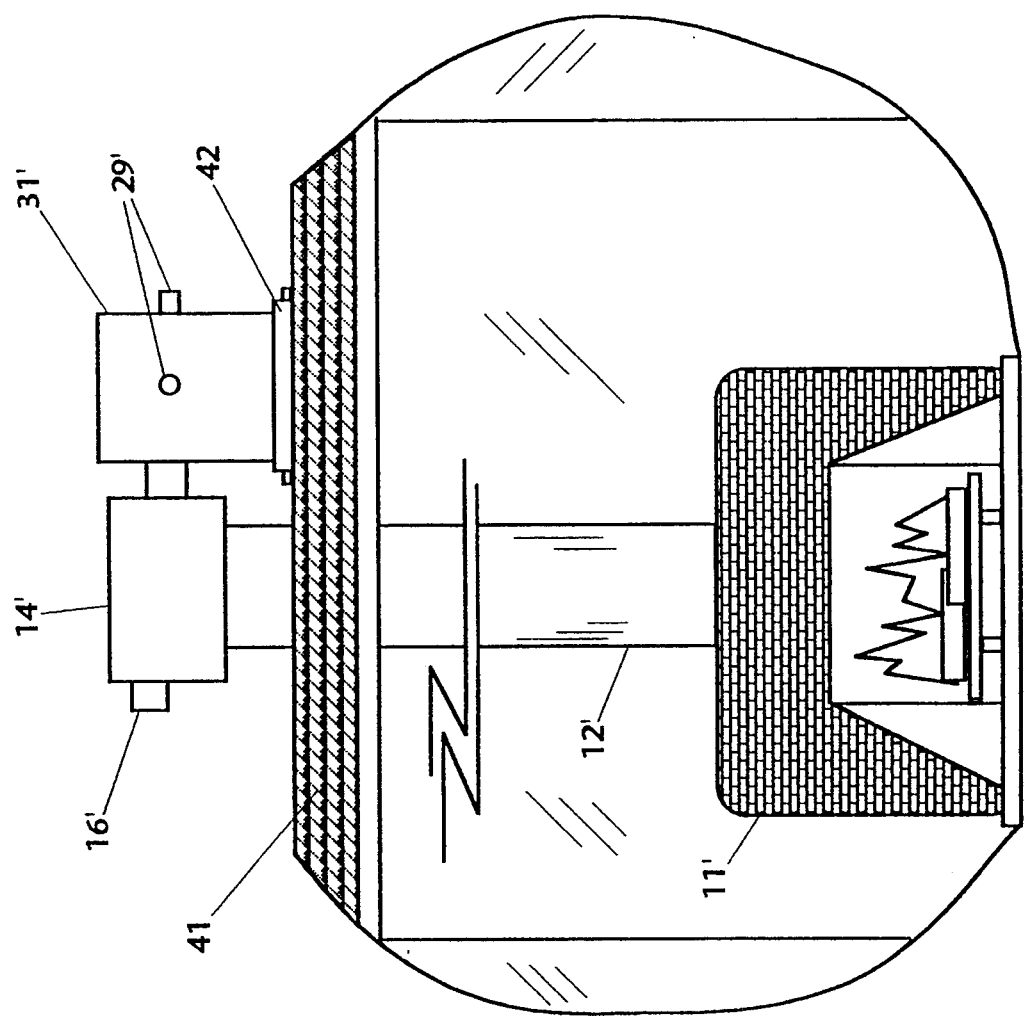
Figure_3

CHIMNEY SMOKE SCRUBBER

BACKGROUND OF THE INVENTION

In the past two decades there has been a renewed interest in non-petroleum fuels for heating, particularly for domestic use. Many individuals have installed high efficiency stoves that burn wood and wood byproduct fuels, or fireplace inserts for existing fireplaces that increase combustion efficiency, heat distribution, and safety. The use of wood and wood byproducts, which are renewable resources, is apparently a significant step away from reliance on petroleum, which is becoming depleted and will become more expensive. Moreover, wood fuels are produced primarily domestically, whereas oil and natural gas for heating are produced predominantly by offshore sources and are subject to the vagaries of foreign control.

Combustion of wood inherently produces more smoke, soot, and other byproducts that combustion of oil or natural gas. Thus an unfortunate side effect of increased use of wood for domestic heating is an increase in air pollution. In some communities where many individuals have adopted wood-fired heating systems, there is a noticeable degradation in air quality during the winter heating season. Indeed, some communities have had to limit wood-fired heating systems to meet minimum air quality standards set by state and federal regulations.

Another disadvantage of the use of wood-burning stoves and fireplaces is the release of sparks and cinders from the chimney. These hot particles are capable of starting roof fires, especially on wood shake roofs, and also setting fire to surrounding vegetation such as trees, dry grass, and the like. Most communities require spark arresters atop the chimney, but their effectiveness can be affected by high winds, low humidity, and the type of fuel being burned.

There are known in the prior art many forms of smoke scrubbers and stack gas scrubbers. These devices generally treat smoke and gas from a flue by washing the flue gases with water or an aqueous solution. The flue gases may be driven by blower through a tank containing the aqueous solution, or may be treated by spraying water through the flue gas stream. These prior art scrubber systems have generally been designed for large industrial applications, and there are no such systems available for small-scale applications such as domestic wood-fired stoves and fireplaces. Moreover, the prior art scrubber systems are highly technical and require a trained operator or engineer, whereas a domestic system must be sufficiently simple for operation by the average homeowner.

SUMMARY OF THE PRESENT INVENTION

The present invention generally comprises a chimney smoke scrubber device adapted for domestic use. The chimney smoke scrubber is particularly adapted for use with wood-fired stoves, fireplaces, and the like, although other combustion devices utilizing other smoky fuels may also benefit from the invention.

The chimney smoke scrubber includes a chimney cap enclosure secured atop the chimney or flue pipe of a combustion unit. A blower is connected to the chimney cap enclosure to draw smoke and combustion gases from the enclosure and deliver them under pressure to a scrubber chamber. The scrubber chamber comprises a tank holding a charge of water or aqueous solution, and the duct outlet from the blower is submerged within the tank. The smoke and flue gases bubble through the water, cooling and cleaning them, extinguishing all cinders, and removing all fly ash.

The assembly includes a thermal sensor operatively associated with the chimney or flue to detect a temperature rise therein. The thermal sensor may be disposed within the chimney or flue pipe, and is connected to start a timer whenever there is a sufficient temperature rise to indicate that a fire has been started within the combustion unit. After 8–10 minutes the timer activates the blower, which draws smoke flow from the chimney cap enclosure to the scrubber chamber. Thus the unit operates automatically, switching on only when needed, and remaining in operation as long as the fire burns. The thermal sensor switch is an improvement over a manually switched system, in that some individuals would switch off the smoke scrubber before the fire is completely extinguished or the fuel exhausted. The smoke scrubber also obviates the need for a trained operator or attendant.

The blower and motor assembly and scrubber chamber are enclosed within a weatherproof enclosure that is secured on the roof of the building adjacent to the chimney cap enclosure, so that the entire assembly forms a compact unit that is easily installed. The scrubber chamber is vented out of the weatherproof enclosure to release the cleaned combustion gases to the atmosphere. In addition, the chimney cap enclosure includes a flapper valve that permits discharge of smoke and combustion gases to atmosphere if the smoke scrubber fails to operate, in the case of a power failure, or if the flue gas flow exceeds the capacity of the blower to remove them from the enclosure. Thus the combustion unit cannot back up and discharge into the building, maintaining the safety of the building and the health of its occupants.

BRIEF DESCRIPTION OF THE DRAWING

FIG. 1 is schematic representation of the chimney cap enclosure and blower assembly portions of the smoke scrubber of the present invention.

FIG. 2 is a schematic representation of the blower assembly and scrubber chamber portions of the invention.

FIG. 3 is a plan elevation of an embodiment of the smoke scrubber mounted in a typical home installation.

DESCRIPTION OF THE PREFERRED EMBODIMENT

The present invention generally comprises a chimney smoke scrubber device adapted for use with wood-fired stoves, fireplaces, and the like, although it may be used with other combustion devices utilizing other smoke-generating fuels. With regard to FIG. 1, a typical combustion device 11 such as a fireplace or stove is connected to a chimney or flue 12 having a damper control 13. The smoke scrubber includes a chimney cap enclosure 14 secured atop the chimney or flue pipe 12. The enclosure 14 includes an overflow flapper valve 16 which is normally closed, so that the enclosure 14 generally captures all of the smoke and combustion gases generated by the fire in the device 11. The valve 16 permits safe operation of the scrubber and combustion unit 11 if, for example, the damper 13 is unintentionally set to full open and the combustion gas flow into the enclosure 14 exceeds the capacity of the blower 21. A thermal sensor 17 includes a heat sensor operatively associated with the chimney or flue pipe to sense the temperature therein. The heat sensor 17 may be disposed in the upper end of the chimney or flue pipe 12, and an armored, temperature resistant cable 18 extends from the thermal sensor 17 upwardly through the enclosure 14. The sensor may also be mounted on the exterior of the flue pipe or chimney.

The smoke scrubber further includes a blower 21 having an intake duct 20 connected to the enclosure 14, and an electric motor 22 for driving the blower 21. The motor 22 is supplied with electrical power through a thermal switch/timer module 23, which in turn is connected to the cable 18 from the thermal sensor 17. Whenever the ambient temperature within the upper end of the chimney or flue pipe 12 exceeds a predetermined value which is indicative of a fire burning within the device 11, the thermal sensor 17 activates the timer portion of the module 23. After 8–10 minutes the timer activates the motor 22 to draw smoke from the chimney cap enclosure and deliver it to the scrubber chamber. This arrangement permits the motor 22 to be actuated when needed, and to remain operating the entire remaining time the fire burns. The thermal switch 23 shuts off the blower motor 22 when the temperature within the flue pipe falls, so that the operation of the scrubber is substantially automatic.

The smoke scrubber further includes a scrubber chamber, shown in FIG. 2, comprising a tank 26 holding a charge of water or aqueous solution 27. The water 27 may contain detergent to dissolve the oily and sooty components of the flue gases and smoke, as well as buffering compounds to stabilize the pH of the water, and the like. The output duct 28 of the blower 21 extends below the level of the water 27, so that the smoke and flue gases must bubble through the water before exiting through vents 29 of the tank. The passage of the bubbles of flue gases and smoke through the water cools the gases and removes a substantial portion of the smoke particles and fly ash and other solid particles. The water also extinguishes all burning cinders, so that there is no chance for the discharged, cleaned smoke to start any accidental fires.

The blower 21, motor 22, thermal switch 23, and tank 26 may be secured within a housing 31 to form a small unit enclosing the major components of the system. The vents 29 extend from the housing 31 to release the cleaned flue gases to the atmosphere.

With regard to FIG. 3, there is shown a preferred embodiment of the invention that is particularly adapted for home use. Similar components are labeled with the same reference numerals having an added prime (′) designation. An existing home fireplace 11′ is connected to a chimney and flue pipe assembly 12′ which extends to the roof 41 of the home. The chimney cap enclosure 14′ is secured atop the chimney 12′, with the flapper valve 16′ set to open and vent excessive combustion gases. A weatherproof housing 31′ is disposed on the roof adjacent to the upper end of the chimney, and is secured to the roof by a mounting bracket 42. The vents 29′ of the scrubber chamber extend from the housing 31′ to release clean combustion gases to atmosphere. The housing 31′ encloses and protects the major components of the system, and provides a simple means for mounting the system on the roof adjacent to the chimney.

It should be noted that the thermal sensor 17 of the smoke scrubber provides automatic operation of the scrubber, so that clean flue gases are always vented to the atmosphere, whether or not the owner or operator remembers to actuate the scrubber. Furthermore, the scrubber can be used even though the fireplace or stove is unattended while combustion takes place, so that the combustion unit can be operated safely, e.g., throughout the night, or when the home is uninhabited for many hours. Moreover, the thermal control prevents the operator from switching off the scrubber system prematurely, before the fuel in the combustion unit is completely burned.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. A smoke scrubber device for use with a combustion device having a flue pipe, including;
   an enclosure secured atop the flue pipe to capture flue gases from the combustion device;
   blower means having an intake connected to said enclosure for removing said flue gases from said enclosure;
   scrubber chamber means, including a tank holding a charge of liquid;
   said blower means including an output duct discharge submerged in said charge of liquid, whereby said flue gases are caused to bubble through said liquid and deposit smoke and ash particulates in said liquid; and,
   thermal sensor means operatively associated with the flue pipe for detecting a threshold temperature indicative of flue gases rising from the combustion device, and operating said blower means whenever said threshold temperature is exceeded.

2. The smoke scrubber device claim 1, wherein said enclosure includes valve means for releasing excess flue gas from said enclosure.

3. The smoke scrubber device of claim 2, wherein said valve means includes a flapper valve opening to atmosphere.

4. The smoke scrubber device of claim 2, further including a weatherproof housing for enclosing said blower means and scrubber chamber means.

5. The smoke scrubber device of claim 4, further including mounting means for securing said weatherproof housing on an exterior roof surface adjacent to the upper end of the flue pipe.

6. The smoke scrubber device of claim 4, wherein said tank of said scrubber chamber means includes at least one vent for releasing cleaned flue gas to atmosphere.

7. The smoke scrubber device of claim 6, wherein said at least one vent extends from said tank through said weatherproof housing.

8. The smoke scrubber device of claim 1, wherein said liquid comprises an aqueous solution.

9. The smoke scrubber device of claim 1, wherein said thermal sensor means is disposed within an upper end portion of said flue pipe.

10. The smoke scrubber device of claim 9, further including timer means operated by said thermal sensor means to activate said blower means after a time delay.

* * * * *